UNITED STATES PATENT OFFICE 2,337,846

AMIDES OF CYCLOALKYL - SUBSTITUTED SATURATED ALIPHATIC - CARBOXYLIC ACIDS

Gerald H. Coleman and Wesley D. Schroeder, Midland, Mich., assignors to The Dow Chemical Company, Midland, Mich., a corporation of Michigan No Drawing. Application July 2, 1941, Serial No. 400,863

3 Claims. (Cl. 260—561)

The present invention is directed to a novel group of acid amides and is particularly concerned with amides of cycloalkyl-substituted saturated aliphatic-carboxylic acids, having the formula

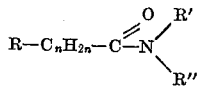

wherein $n$ is an integer between 2 and 11, inclusive, R represents a cycloalkyl radical containing at least six carbon atoms, R' represents an alkyl, cycloalkyl, or aralkyl radical, and R" represents an alkyl, cycloalkyl, or aralkyl radical or hydrogen. Preferred compounds falling within the scope of the present invention are those in which R and R' represent cyclohexyl radicals and $n$ is 3 or 5.

We have prepared representative members of the above-identified group of compounds and determined their physical and chemical properties. These compounds are useful as modifiers for plastic compositions and as intermediates in the preparation of more complex organic derivatives.

The new compounds may be prepared by reacting a suitable cycloalkyl-substituted saturated aliphatic-carboxylic acid with a primary or secondary alkyl, cycloalkyl, or aralkyl amine, preferably in the presence of acetic anhydride. Substantially equimolar proportions of the amine and acid have been found to give the desired amide in good yield. The reaction is carried out at such a temperature as results in the distillation of acetic acid as formed. When the reaction is complete, the crude mixture may be fractionally distilled under reduced pressure or, if a solid product be obtained, purification may be accomplished by crystallization from a suitable organic solvent.

A representative preparation is that involving the reaction of 4-cyclohexyl-butanoic acid with cyclohexyl amine to form N-cyclohexyl-4-cyclohexyl-butanamide. This procedure is described in detail in Example 1 and may be illustrated by the following equation $$\underset{\substack{CH_2-CH_2 \\ CH_2 \quad\quad CH-CH_2CH_2CH_2-C-OH \\ CH_2-CH_2}}{} + \underset{\substack{CH_2-CH_2 \\ CH_2 \quad\quad CH-NH_2 \\ CH_2-CH_2}}{} \longrightarrow$$

$$\underset{\substack{CH_2-CH_2 \\ CH_2 \quad\quad CH-CH_2CH_2CH_2-C-N-CH \\ CH_2-CH_2}}{\overset{H \quad\quad O \ H \quad\quad CH_2-CH_2}{\underset{\quad\quad\quad\quad\quad\quad CH_2-CH_2}{}}} + H_2O$$

Another method which may be employed in the preparation of these compounds comprises reacting a lower alkyl ester of a cycloalkyl-substituted saturated aliphatic-carboxylic acid with a suitable amine. A small proportion of an amine hydrohalide may be employed as a reaction accelerator if desired. When operating according to this procedure, it is generally sufficient to heat the reactants together for several hours or to mix the reactants and allow them to stand for a period varying from a week to several months to accomplish the reaction. If desired, a diluent such as absolute ethanol may be employed in the reaction mixture.

An alternate procedure, and one particularly adapted for use in the preparation of amides from low boiling amines such as dimethyl amine, ethyl amine, diethyl amine, and the like, comprises treating the cycloalkyl-substituted saturated aliphatic-carboxylic acid with thionyl chloride or other agent to produce an acid chloride. One mol of the acid chloride and at least 2 mols of the amine are then reacted together at a temperature of from 60° to 80° C. and at atmospheric pressure.

The following examples illustrate the invention but are not to be construed as limiting the same.

Example 1

10.1 grams of 4-cyclohexyl-butanoic acid, 5.88 grams of cyclohexyl amine, and 7 grams of acetic anhydride were mixed together and heated at 175°–230° C. for 4 hours. Acetic acid was continuously distilled out of the mixture as formed. When no more acetic acid was evolved, the reaction mixture was cooled. The resulting semisolid mixture was recrystallized from petroleum ether to obtain 6 grams of N-cyclohexyl-4-cyclohexyl-butanamide melting at 90°–92° C. This compound is insoluble in water, difficultly soluble in petroleum distillate, and soluble in carbon tetrachloride and 95 per cent ethanol.

Example 2

42.4 grams of the methyl ester of 6-cyclohexyl-hexanoic acid, 19.8 grams of cyclohexyl amine, and 13.6 grams of cyclohexyl ammonium iodide were mixed together and heated for several hours at a temperature of approximately 200° C. The crude reaction mixture was then fractionally distilled to obtain 20 grams of N-cyclohexyl-6-cyclohexyl-hexanamide boiling at 199°–201° C. at 1 mm. pressure and having a melting range of 70°–75° C. This product is insoluble in water and somewhat soluble in petroleum distillate, carbon tetrachloride, and 95 per cent ethanol.

Other acids which may be employed in accordance with the procedures set forth in the examples include 3-cyclohexyl-propanoic acid, 5-cyclohexyl-pentanoic acid, 4-tertiarybutyl-6-(para-tertiarybutyl-cyclohexyl)-hexanoic acid, 4-methyl-6-(para-methyl-cyclohexyl)-hexanoic acid, 6-(para-chloro-cyclohexyl)-hexanoic acid, 6-(para-benzyl-cyclohexyl)-hexanoic acid, 7-cyclohexyl-heptanoic acid, 8-(2-cyclohexyl-cyclohexyl)-octanoic acid, cyclohexyl-dodecanoic acid, and the like.

In place of cyclohexyl amine as shown in the examples, the following may be employed: N.N-dicyclohexyl amine, N-ethyl-N-cyclohexyl amine, N-benzyl-N-cyclohexyl amine, 4-tertiarybutyl-cyclohexyl amine, 2-chlorocyclohexyl amine, 4-cyclohexyl-cyclohexyl amine, N-butyl amine, N-ethyl-N-isobutyl amine, N.N-diamyl amine, octyl amine, dodecyl amine, benzyl amine, N.N-dibenzyl amine, beta-phenylethyl amine, N-methyl-N-beta-phenylethyl amine, and the like.

We claim:

1. N-cyclohexyl-4-cyclohexyl-butanamide.
2. N-cyclohexyl-6-cyclohexyl-hexanamide.
3. An N-cycloalkyl amide having the formula

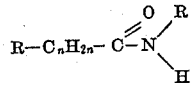

wherein $n$ represents an integer from 2 to 11, inclusive, and each R represents a radical selected from the group consisting of cyclohexyl and halo- and hydrocarbon-substituted cyclohexyl radicals.

GERALD H. COLEMAN.
WESLEY D. SCHROEDER.